(12) United States Patent
Choi et al.

(10) Patent No.: US 7,096,020 B2
(45) Date of Patent: Aug. 22, 2006

(54) SYSTEM AND METHOD FOR IMPLEMENTING A HANDOFF USING A MULTIPARTY SERVICE IN A MOBILE COMMUNICATION SYSTEM

(75) Inventors: Jae-Am Choi, Yongin-shi (KR); Chan-Byoung Chae, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 319 days.

(21) Appl. No.: 10/337,717

(22) Filed: Jan. 7, 2003

(65) Prior Publication Data

US 2003/0224791 A1    Dec. 4, 2003

(30) Foreign Application Priority Data

Jan. 7, 2002    (KR) .................. 10-2002-0000755

(51) Int. Cl.
*H04Q 7/20*    (2006.01)

(52) U.S. Cl. .................. 455/439; 370/331; 455/440; 455/442

(58) Field of Classification Search ............. 455/436, 455/437, 440, 439, 43.8, 442; 370/331, 260, 370/261
See application file for complete search history.

(56) References Cited

U.S. PATENT DOCUMENTS 5,289,525 A * 2/1994 Issenmann et al. ......... 455/436
6,542,744 B1 * 4/2003 Lin ............................ 455/437
6,584,087 B1 * 6/2003 Czaja et al. ................ 370/335
6,807,421 B1 * 10/2004 Ahmavaara ................ 455/438
6,888,803 B1 * 5/2005 Gentry et al. .............. 370/259
2002/0142761 A1 * 10/2002 Wallstedt et al. .......... 455/416

* cited by examiner

*Primary Examiner*—George Eng
*Assistant Examiner*—Julie E Stein
(74) *Attorney, Agent, or Firm*—Dilworth & Barrese LLP

(57) ABSTRACT

A handoff system and method using an MPTY (multiparty) service in a mobile communication system. When a terminal senses that it is located at the boundary of a WCDMA during a WCDMA communication service, it transitions to a first state. In the first state, the terminal requests an MPTY service to a BS in a CDMA network. If the strength of a first current WCDMA signal is less than a predetermined first threshold, the terminal transitions to a second state. In the second state, the terminal requests an available MPTY call to be maintained. If the strength of a second current WCDMA signal is less than a predetermined second threshold, the terminal transitions to a third state. Then the terminal establishes a CDMA call using the maintained MPTY call in the third state. If the strength of a third current WCDMA signal is less than a predetermined third threshold, the terminal ends the WCDAM call.

9 Claims, 6 Drawing Sheets

SYSTEM AND METHOD FOR IMPLEMENTING A HANDOFF USING A MULTIPARTY SERVICE IN A MOBILE COMMUNICATION SYSTEM

PRIORITY

This application claims priority to an application entitled "System and Method for Implementing Handoff Using Multiparty Service in a Mobile Communication System" filed in the Korean Industrial Property Office on Jan. 7, 2002 and assigned Serial No. 2002-755, the contents of which are hereby incorporated by reference.

BACKGROUND OF THE INVENTION

1. Field of the Invention

The present invention relates generally to a mobile communication system, and in particular, to a system and method for implementing handoffs between heterogeneous networks using different communication schemes.

2. Description of the Related Art

With the drastic development of mobile communication technology, mobile communication services are being provided in a variety of schemes. A new mobile communication scheme is first deployed only in a trial network. When a mobile subscriber moves out of the trial network, he can continue his communication without interruption only if a handoff is performed between the new communication scheme-based network and an existing mobile communication network. If the handoff is not available, the communication service is discontinued.

An example of a new mobile communication scheme is a third-generation (3G) mobile communication system, WCDMA (Wideband Code Division Multiple Access) and an existing mobile communication scheme is a second-generation (2G) mobile communication system, CDMA (Code Division Multiple Access). The heterogeneous mobile communication networks will be described below with reference to FIG. 1.

FIG. 1 schematically illustrates a conventional mobile communication system. Referring to FIG. 1, a WCDMA network 100 includes a UE (User Equipment, i.e., a WCDMA telephone) 111 for receiving a communication service in WCDMA, a Node B 113, an RNC (Radio Network Controller) 115, and a UMSC (UMTS Mobile Switching Center) 117. The RNC 115, connected to a core network (CN: not shown), controls all processing related with connection to the UE 111 and radio resource assignment to UEs connected to the Node B 113. The Node B 113 controls channel assignment to the UE 111 in a physical layer.

A CDMA network 150 includes an MS (Mobile Station, i.e., a CDMA telephone) 151 for receiving a communication service in CDMA, a BTS (Base Transceiver Subsystem) 153, a BSC (Base Station Controller) 155, and an MSC 157. The BTS 153, BSC 155, and MSC 157 function in the same manner as the Node B 113, the RNC 115, and the UMSC 117, respectively.

When the UE 111 enters the service area of the CDMA network 150 during a communication service from the WCDMA network 100, a handoff is required to continue the communication service, but is not available.

The followings factors must be considered in order to support the handoff between the WCDMA network 100 and the CDMA network 150.

1. If a typical DBDM (Dual Band Dual Mode) terminal is used:

(1) the DBDM terminal must report the PN (Pseudorandom Noise) offset of a target system, that is, the CDMA network 150 to the CN;

(2) the DBDM terminal must report the RTD (Round Time Delay) of the target system to the CN;

(3) the DBDM terminal must synchronize its timing to the CDMA network 150 when a Handoff from a UMTS Command message is received from the WCDMA network 100; and (4) the DBDM terminal must notify the WCDMA network 100 of its 32-bit ESN (Electronic Serial Number).

2. Radio resource information to be transmitted between MAPs (Mobile Application Parts) in heterogeneous networks: the UMSC 117 must transmit the following information to the MSC 157, and since a UMTS MAP supports this information, some parameters are changed in the 3G MAP and interface 1u-1/F.

(1) Service option;
(2) CDMA frequency;
(3) Frame offset;
(4) Code channel;
(5) Cell ID;
(6) RTD; and
(7) ESN.

3. Additional information to be formed in the RNC: the WCDMA communication system must have the following information about the 2G network as neighbor information.

(1) PN offset;
(2) MSC ID;
(3) BSC ID;
(4) BTS ID;
(5) Sector ID; and
(6) FA (Frequency Allocation) information.

To take the above considerations into account, actual air interface standards must also be changed. Thus, currently, the handoff is impossible.

SUMMARY OF THE INVENTION

It is, therefore, an object of the present invention to provide an apparatus and method for implementing a handoff between heterogeneous networks using different communication schemes.

It is another object of the present invention to provide an apparatus and method for implementing a handoff using a multiparty service in a mobile communication system.

To achieve the above and other objects, a method of implementing a handoff using an MPTY (multiparty) service from a first base station (BS) that provides a communication service in a first communication scheme to a second BS that provides a communication service in a second communication scheme different from the first communication scheme in a mobile communication system is provided. Upon sensing that it is located at the boundary of a network that services in the first communication scheme during the communication service in the first communication scheme, an MS transitions to a first state for starting the communication service in the second communication scheme. The MS requests the MPTY service from the second BS in the first state. If the strength of a first current signal received in the first communication scheme is less than a predetermined first threshold, the MS transitions to a second state. In the second state, the MS requests an available MPTY call to be maintained. If the strength of a second current signal received in the first communication scheme is less than a predetermined second threshold, the MS transitions to a third state. The MPTY service is connected to maintain a call in the first communication scheme and a call of the second communication scheme by establishing the call in the second communication scheme using the maintained MPTY call in the third state. If the strength of a third current signal received in the first communication scheme is less than a predetermined third threshold, the MS ends the call in the first communication scheme.

In a handoff system using an MPTY service in a mobile communication system, upon sensing that neighbor cell information includes information from less than a predetermined number of neighbor cells that service in a first communication scheme during a call of the first communication scheme, an MS requests an MPTY call for a handoff to a network using a second communication scheme, and establishes a call of the second communication scheme using the MPTY call if the MPTY call is connected under a predetermined control. An MSC selects one of current available MPTY calls for the MS upon request for a MPTY call from the MS during the call of the first communication, and assigns the selected MPTY call to the call of the second communication scheme.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
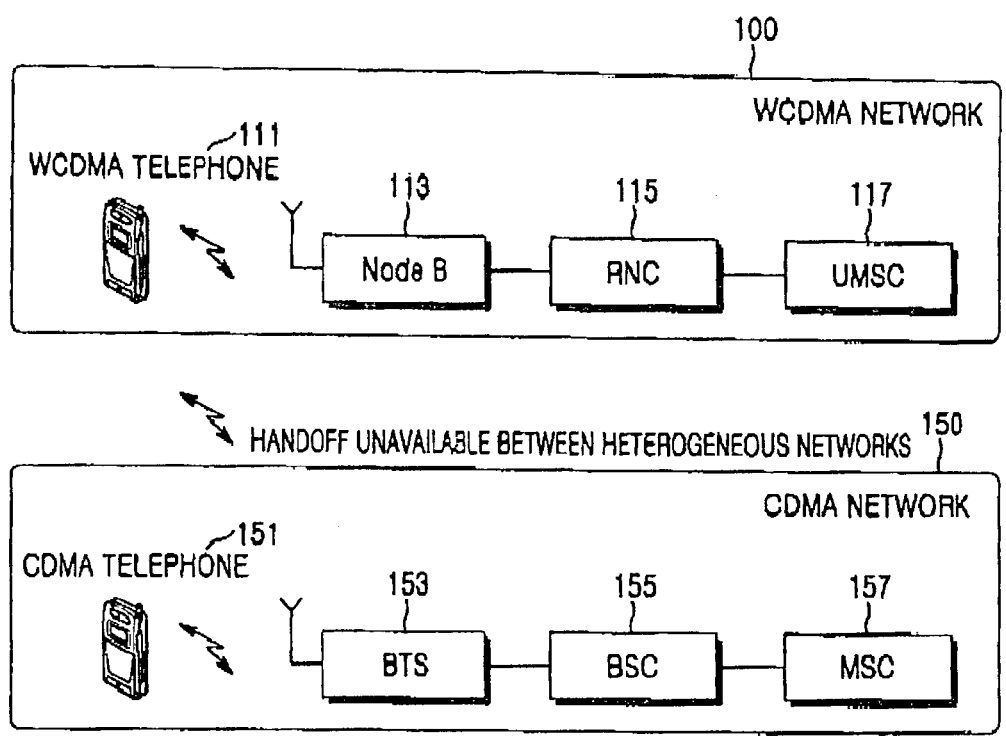
FIG. 1 schematically illustrates a conventional mobile communication system.
Figure 2:
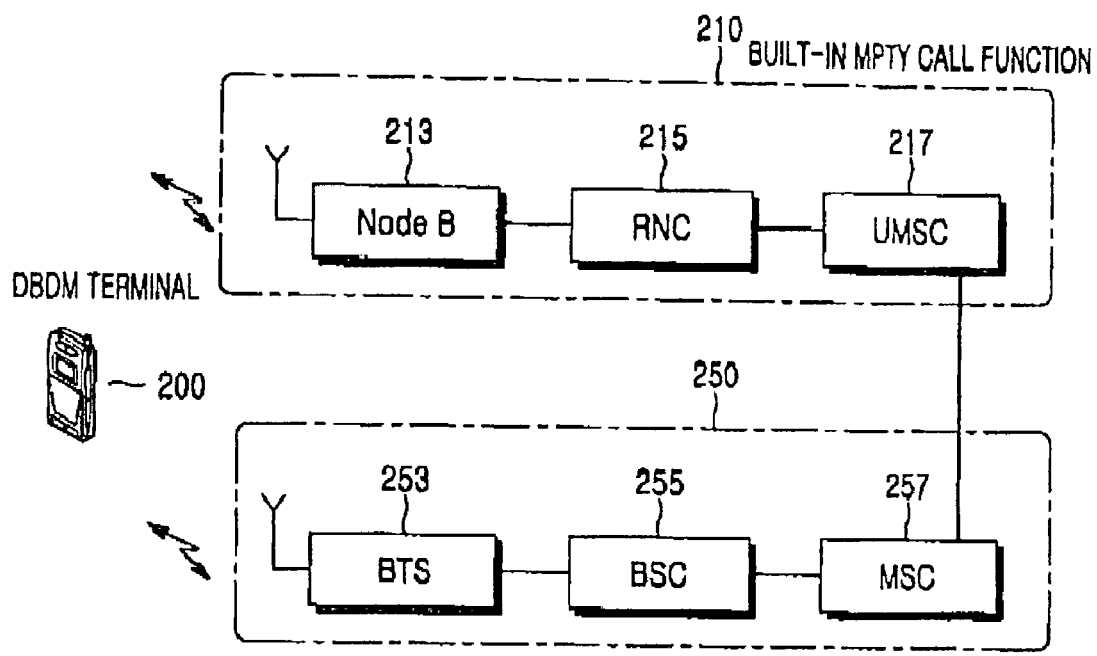
FIG. 2 schematically illustrates a mobile communication system to which the present invention is applied.

Referring to FIG. 2, a DBDM terminal 200 supports both WCDMA and CDMA. A WCDMA network 210 includes a Node B 213, an RNC 215, and a LMSC 217. The RNC 215, connected to a CN (not shown), controls all processing related with connection to terminals and radio resource assignment to terminals connected to the Node B 213. The Node B 213 controls channel assignment to the terminals in a physical layer. The UMSC 217 supports multiparty (hereinafter, referred to as MPTY) service.

A CDMA network 250 includes a BTS 253, a BSC 255, and an MSC 257. The BTS 253, BSC 255, and MSC 257 function in the same manner as the Node B 213, the RNC 215, and the UMSC 217, respectively. The UMSC 217 is connected to the MSC 257 by the MPTY service.

Figure 3:
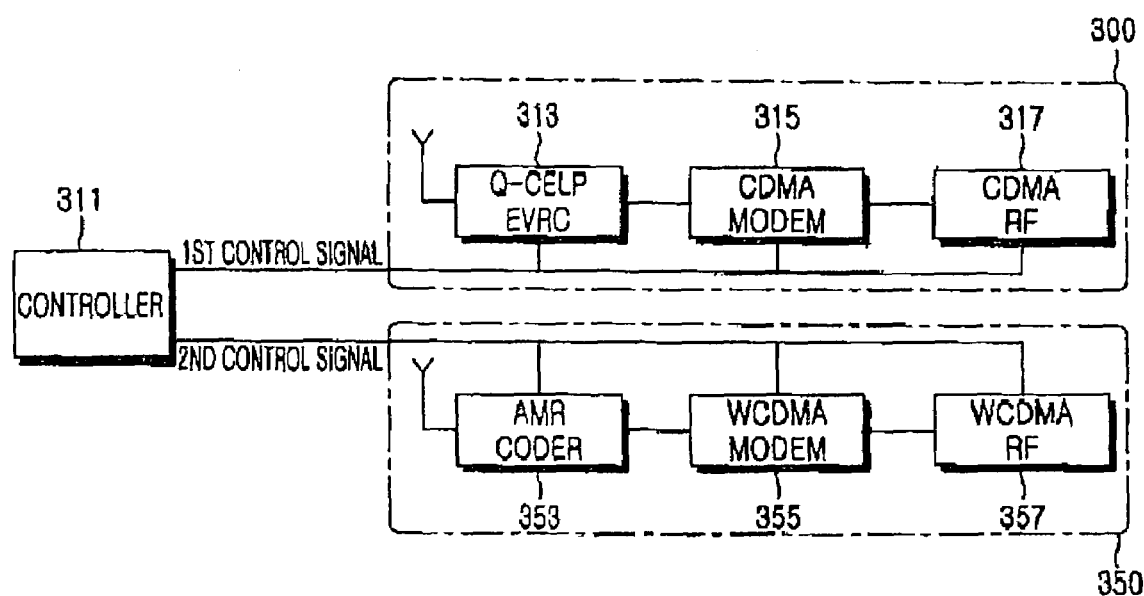
FIG. 3 is a block diagram of a DBDM terminal to which the present invention is applied.

FIG. 3 is a block diagram of the DBDM terminal 200 illustrated in FIG. 2. Referring to FIG. 2, the DBDM terminal 200 includes a CDMA processing unit 300 and a WCDMA processing unit 350. A controller 311 provides overall control to the DBDM terminal 200, and controls power supply for signal processing according to a selected communication scheme between WCDMA and CDMA.

The CDMA processing unit 300 includes a Q-CELP (Qualcomm-Code Excited Linear Prediction) EVRC (Enhanced Variable Rate Coding) block 313, a CDMA MODEM 315, and a CDMA RF (Radio Frequency) module 317. The Q-CELP EVRC block 313 encodes or decodes input data by Q-CELP EVRC. The CDMA MODEM 315 modulates transmission data in CDMA and demodulates received data in CDMA. The CDMA RF module 317 downconverts the frequency of an RF signal received from the air or upconverts the frequency of transmission data.

The WCDMA processing unit 350 includes an AMR (Adaptive MultiRate) coder 353, a WCDMA MODEM 355, and a WCDMA RF module 357. The AMR coder 353 encodes or decodes input data by AMR coding. The WCDMA MODEM 355 modulates transmission data in WCDMA and demodulates received data in WCDMA. The WCDMA RF module 357 downconverts the frequency of an RF signal received from the air or upconverts the frequency of transmission data.

Figure 4:
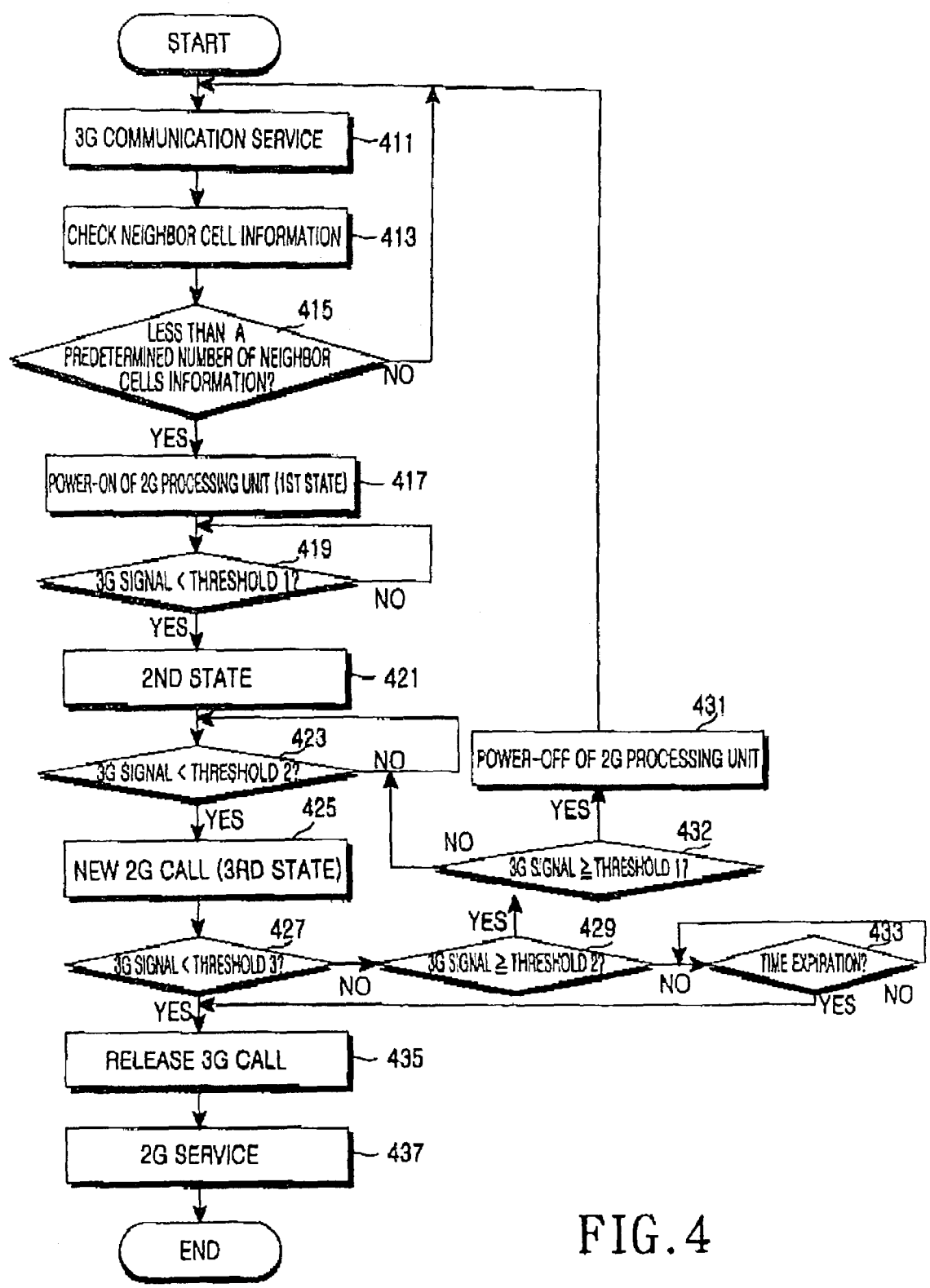
FIG. 4 is a flowchart illustrating a method of implementing a handoff from a 3G communication network to a 2G communication network according to an embodiment of the present invention.

FIG. 4 is a flowchart illustrating a handoff procedure from a 3G communication network to a 2G communication network according to an embodiment of the present invention. In step 411, when the DBDM terminal 200 communicates in a 3G communication scheme, that is, in WCDMA, the controller 311 supplies power only to the WCDMA processing unit 350. Therefore, the DBDM terminal 200 operates only in WCDMA. In step 413, the controller 311 continuously monitors neighbor cell information during communication in WCDMA. Here it is assumed that the neighbor cell information includes 6 neighbor cells.

The controller 311 determines whether the neighbor cell information includes less than 6 neighbor cells in step 415. Since the DBDM terminal 200 operates in WCDMA, the controller 311 can recognize only cells that communicate in WCDMA. If a cell does not operate in WCDMA, the controller 311 cannot recognize the cell as a neighbor cell. Thus, the controller 311 recognizes less than 6 neighbor cells, for example, 4 neighbor cells. If it turns out that 6 neighbor cells communicate in WCDMA, the controller 311 returns to step 411.

On the other hand, if less than 6 neighbor cells operate in WCDMA, the controller 311 turns on the CDMA processing unit 300 in step 417. Before the CDMA processing unit 300 is on, power is supplied only to the WCDMA processing unit 350. From the neighbor cell information including less than 6 neighbor cells, the controller 311 senses that the DBDM terminal 200 is located at a boundary of the WCDMA network. Then the controller 311 also supplies power to the CDMA processing unit 300 to implement a handoff to the CDMA network. This state is defined as a first state.

In step 419, the controller 311 compares the strength of a current received 3G signal (i.e., a WCDMA signal) with a predetermined first threshold (threshold 1). In general, the SNR (Signal-to-Noise Ratio) of a CPICH (Common Pilot Channel) is measured as the strength of the WCDMA signal is measured. If the WCDMA signal strength is equal to or greater than threshold 1, the controller 311 continues step 419. If the WCDMA signal strength is less than threshold 1, the controller 311 transitions to a second state in step 421. In the second state, the controller 311 requests an MPTY service from the CDMA network. More specifically, the controller 311 requests the UMSC 217 supporting WCDMA to provide the MPTY service to thereby request a CDMA call (2G call) from the WCDMA network.

In step 423, the controller 311 compares a current WCDMA signal strength with a predetermined second threshold (threshold 2). If the WCDMA signal strength is equal to or greater than threshold 2, the controller 311 continues step 423. If the WCDMA signal strength is less than threshold 2, the controller 311 establishes a new 2G call with the same origination telephone number of the existing 3G call by the MPTY service in step 425. Establishment of the 2G call by the MPTY service is defined as a third state. In step 427, the controller 311 compares a current WCDMA signal strength with a predetermined third threshold (threshold 3). If the WCDMA signal strength is equal to or greater than threshold 3, the controller 311 continues step 427. If the WCDMA signal strength is less than threshold 3, the controller 311 goes to step 429.

In step 429, the controller 311 compares the WCDMA signal strength with threshold 2. If the WCDMA signal strength is equal to or greater than threshold 2, the controller 311 compares the WCDMA signal strength with threshold 1 in step 432. If the WCDMA signal strength is equal to or greater than threshold 1, the controller 311 goes to step 431. On the other hand, the WCDMA signal strength is less than threshold 1, the controller 311 returns to step 423. In step 431, the controller 311 turns off the CDMA processing unit 300 and returns to step 411. The power-off of the CDMA processing unit 300 implies that the DBDM terminal 200 moves from the boundary of the WCDMA network to its service area, and thus, the handoff to the CDMA network is unnecessary.

If the current WCDMA signal strength is less than threshold 2 in step 429, the controller 311 determines whether a predetermined time period Δt expires after transition to the third state in step 433. The time period Δt is the time required to minimize the ping-pong phenomenon that the WCDMA signal strength is continuously varied for a short time period. If the time period Δt has not expired, the controller 322 continues step 433. Upon time expiration, the controller 311 releases the ongoing 3G call in step 435 and goes to step 437. As the 3G call is released, the WCDMA processing unit 350 is turned off. In step 437, the controller 311 operates the DBDM terminal 200 in CDMA and terminates the procedure.

Figure 5:
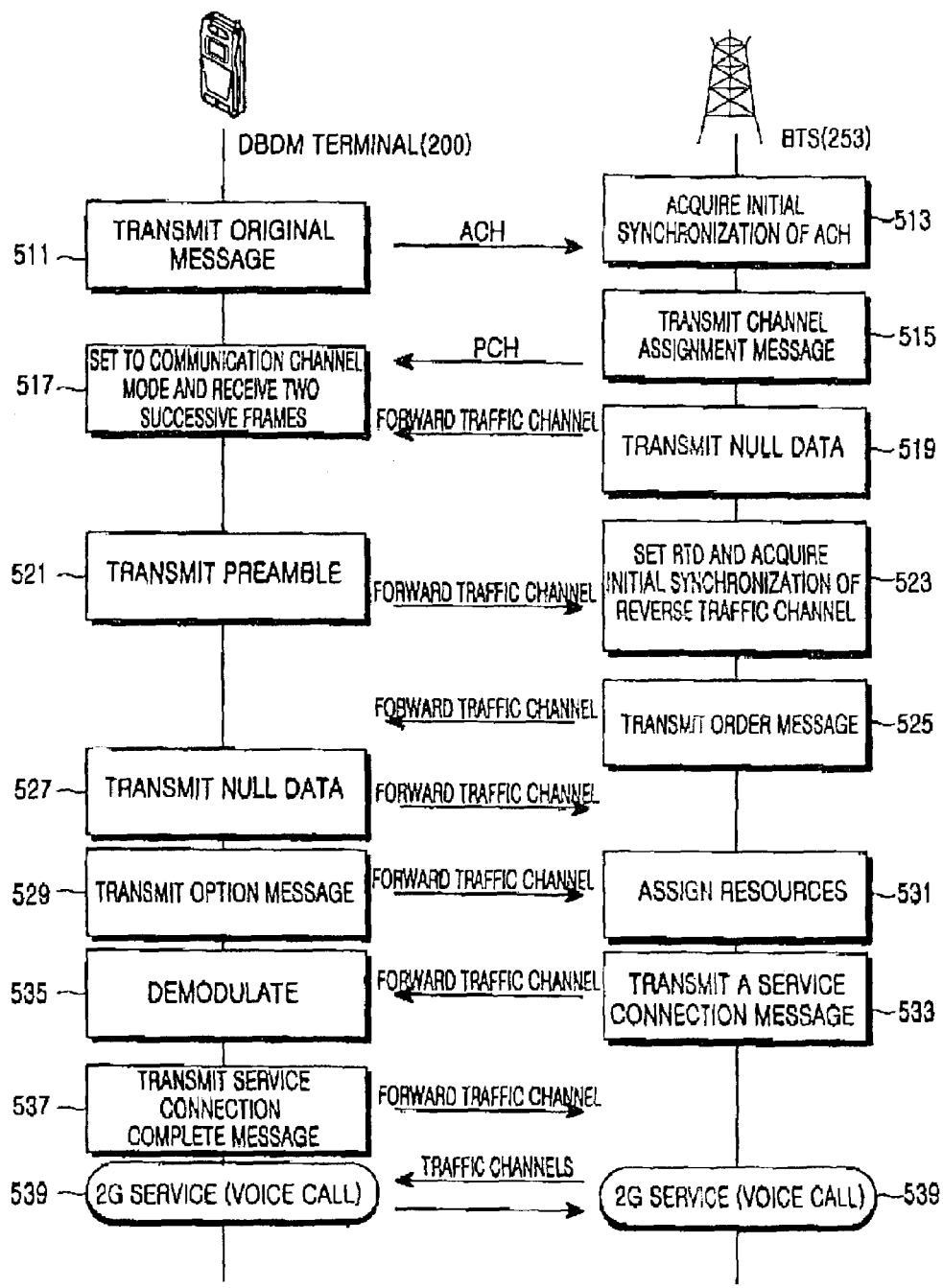
FIG. 5 is a flowchart illustrating a new CDMA call setup depicted in FIG. 4.

FIG. 5 is a flowchart illustrating the new CDMA call (2G call) setup depicted in FIG. 4. Referring to FIG. 5, the DBDM terminal 200 starts to set up a new 2G call by transmitting an original message on an ACH (Access Channel) to the BTS 253 in the CDMA network in step 511. After the BTS 253 acquires initial synchronization using a preamble signal of the ACH in step 513, it transmits to the DBDM terminal 200 a Channel Assignment message containing a channel frequency and the index of a Walsh code being a channelization code on a PCH (Paging Channel) in step 515. The DBDM terminal 200 changes its reception mode to a communication channel reception mode in step 517.

In step 519, the BTS 253 transmits null data on a forward traffic channel. The DBDM terminal 200 receives frames on the forward traffic channel in the communication channel reception mode, while receiving a downlink channel frame from the Node B 213 in step 517. In step 521, the DBDM terminal 200 transmits a preamble signal on a reverse traffic cannel to the BTS 253.

The BTS 253 sets the center of a window using the RTD of the ACH signal and then acquires initial synchronization to the reverse traffic channel in step 523. Then the BTS 253 transmits an order message representing the initial synchronization acquisition to the DBDM terminal 200 in step 525. Upon receipt of the order message, the DBDM terminal 200 transmits null data on the reverse traffic channel in step 527, and transmits to the BTS 253 a service option message with a desired service option, for example, a service option indicating a voice call in step 529.

The BTS 253 determines that the DBDM terminal 200 wants a voice call by detecting the service option set in the service option message and assigns radio resources for the voice call in step 531. The BTS 253 transmits to the DBDM terminal 200 a Service Connection message representing an actual connection on the forward traffic channel in step 533.

In step 535, the DBDM terminal 200 demodulates a forward traffic channel signal received according to the service option. The DBDM terminal 200 then transmits a Service Connection Complete message to the BTS 253 in step 537. Thus, as actual traffic channels are established between the DBDM terminal 200 and the BTS 253, the 2G voice call is conducted between the DBDM terminal 200 and the BTS 253 in step 539.

Figure 6:
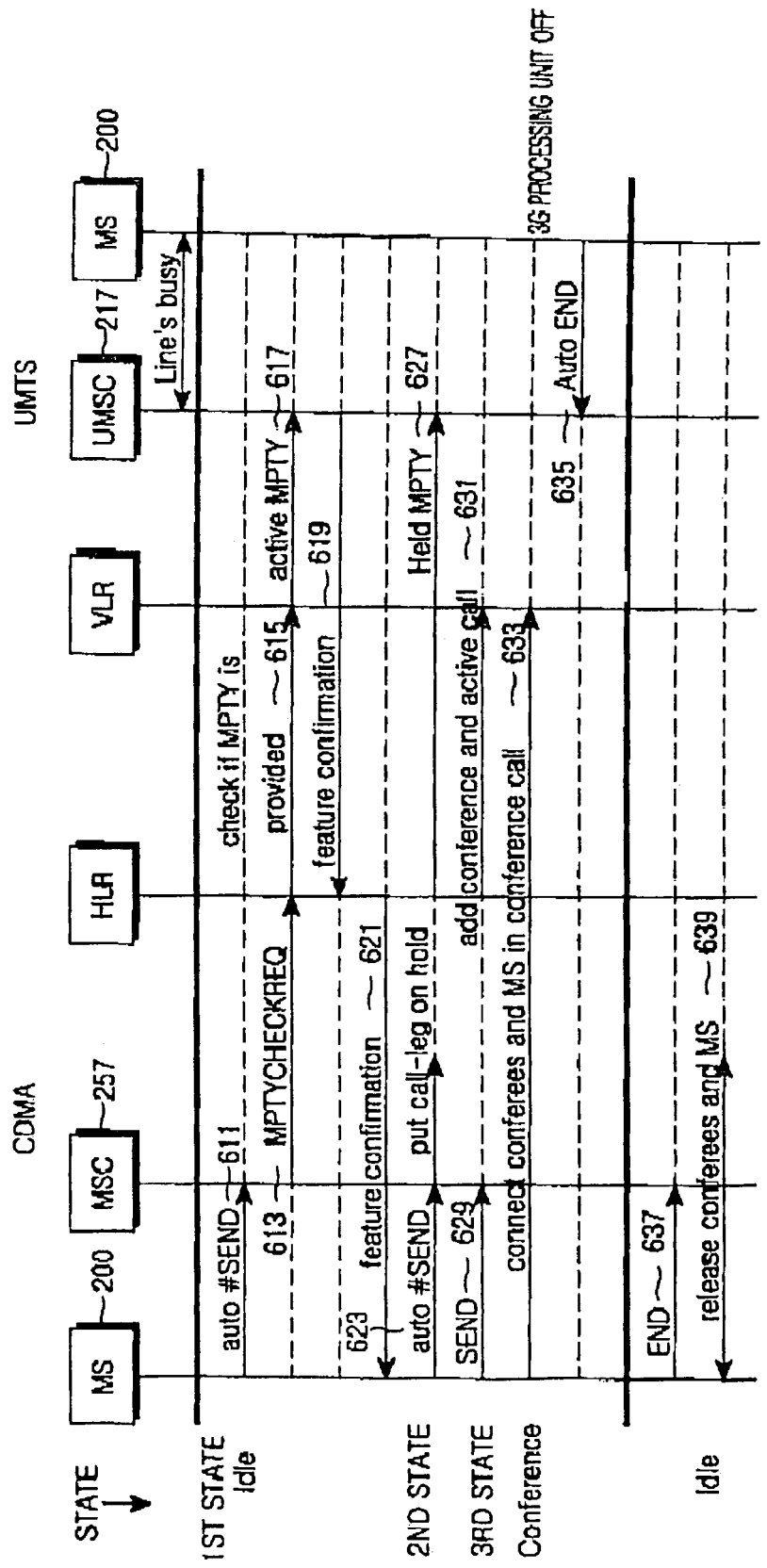
FIG. 6 is a diagram illustrating a signal flow for a multiparty call setup at a handoff from the 3G communication network to the 2G communication network according to the embodiment of the present invention.

FIG. 6 is a diagram illustrating a signal flow for setting an MPTY service at a handoff from a 3G communication network to a 2G communication network according to the embodiment of the present invention. It is to be noted here that since the single DBDM terminal 200 functions differently depending on whether it operates in CDMA through the CDMA processing unit 300 or in WCDMA through the WCDMA processing unit 350, it is illustrated separately as two MSs 200 in FIG. 6.

Referring to FIG. 6, as the DBDM terminal 200 roams to the boundary of the WCDMA network during a WCDMA service, it is placed in the first state by turning on the CDMA processing unit 300 in step 611. As stated before, the DBDM terminal 200 senses from neighbor cell information including less than a predetermined number of neighbor cells that it is located at the boundary of the WCDMA network. In step 613, the DBDM terminal 200 then automatically transmits an MPTYCHECKREQ message to an HLR (Home Location Register) connected to the MSC 257 though the UMSC 257, asking whether an MPTY service is available. The HLR transmits to a VLR (Visitor Location Register) of the WCDMA network a message asking whether the MPTY is provided in step 615.

In step 617, the VLR transmits an Active MPTY message to the UMSC 217, requesting activation of the MPTY service. If the MPTY service is available, the UMSC 217 transmits a Feature Confirmation message to the HLR through the VLR in step 619. The HLR then transmits the Feature Confirmation message to the DBDM terminal 200 in step 621.

Upon sensing a transition from an idle state to a second state, that is, sensing that a current WCDMA signal strength is less than threshold 1, the DBDM terminal 200 automatically transmits an MPTY call setup request message to the HLR service (put call-leg on hold) in step 623. The HLR transmits a Held MPTY message to the UMSC 217, requesting to maintain a currently available MPTY call (or conference call) in step 627. Then the UMSC 217 maintains the MPTY call for the DBDM terminal 200 among available MPTY calls.

Upon sensing a transition from the second state to a third state, the DBDM terminal 200 requests a new CDMA call in step 629 and the MSC 257 requests setup of the maintained MPTY call as the CDMA call through the HLR and the VLR in step 631. As the CDMA call is connected by the MPTY call, a multiparty call is conducted between the DBDM terminal 200 and the VLR of the WCDMA network in step 633.

Then if the WCDMA processing unit 350 is off, the DBDM terminal 200 automatically terminates the WCDMA call from the WCDMA network in step 635. That is, the DBDM terminal 200 establishes the CDMA call by the MPTY service with the WCDMA call in progress, releases the WCDMA call, and eventually maintains only the CDMA call. If radio resources for the CDMA call are released, the DBDM terminal 200 ends the CDMA call in step 637 and releases the MPTY service in step 639.

As described above, the present invention advantageously enables handoff between heterogeneous networks using different communication schemes by an MPTY service without the need for changing radio interfaces. Thus, when a new communication scheme-based network is constructed, a handoff can be implemented compatibly with an existing communication scheme-network, thereby improving communication quality.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of implementing a handoff using a multiparty (MPTY) service from a first base station (BS) that provides a communication service in a first communication scheme to a second BS that provides a communication service in a second communication scheme different from the first communication scheme in a mobile communication system, the method comprising the steps of:

upon sensing a handoff to the second BS, asking a visitor location register (VLR) connected to the second BS for an availability of an MPTY call through a home location register (HLR) connected to the first BS by a mobile station (MS);

notifying the MS of the availability of the MPTY call through the HLR if the MPTY call is available, and ordering a mobile switching center (MSC) that is connected to the VLR to activate the MPTY call by the VLR;

requesting the MSC to maintain one of active MPTY calls by the MS when the MS senses the availability of the MPTY call and transitions to a second state;

maintaining the active MPTY call to be assigned to the MS by the MSC; and establishing a call in the second communication scheme using the maintained MPTY call through the HLR when the MS transitions to a third state and ending a call in the first communication scheme by the MS.

2. The method of claim 1, wherein the first communication scheme is WCDMA (Wideband Code Division Multiple Access) and the second communication scheme is CDMA (Code Division Multiple Access).

3. The method of claim 1, wherein the MS senses the handoff when neighbor cell information includes information from less than a predetermined number of neighbor cells that service in the first communication scheme.

4. A method of implementing in a mobile station (MS) a handoff using a multiparty (MPTY) service from a first base station (BS) that provides a communication service in a first communication scheme to a second BS that provides a communication service in a second communication scheme, which is different from the first communication scheme, in a mobile communication system, the method comprising the steps of:

transitioning to a first state to start the communication service in the second communication scheme when the MS senses that the MS is located at a boundary of a network that services in the first communication scheme during the communication service in the first communication scheme;

requesting the MPTY service to the second BS in the first state and, if the strength of a first current signal received in the first communication scheme is less than a predetermined first threshold, transitioning to a second state;

requesting an available MPTY call to be maintained in the second state and, if the strength of a second current signal received in the first communication scheme is less than a predetermined second threshold, transitioning to a third state; and connecting the MPTY service for maintaining a call in the first communication scheme and a call in the second communication scheme by establishing the call in the second communication scheme using the maintained MPTY call in the third state, and if the strength of a third current signal received in the first communication scheme is less than a predetermined third threshold, ending the call in the first communication scheme.

5. The method of claim 4, wherein the first communication scheme is WCDMA (Wideband Code Division Multiple Access) and the second communication scheme is CDMA (Code Division Multiple Access).

6. The method of claim 4, wherein the MS senses that the MS is located at the boundary when neighbor cell information includes information from less than a predetermined number of neighbor cells that service in the first communication scheme.

7. A handoff system using a multiparty (MPTY) service in a mobile communication system, comprising:

a mobile station (MS) for, upon determining a handoff from a first communication system to a second communication system, if the strength of a first current signal received in the first communication system is less than a predetermined first threshold, requesting an available MPTY call to be maintained, if the strength of a second current signal received in the first communication system is less than a predetermined second threshold, connecting the MPTY service for maintaining a call in the first communication system and a call in the second communication system by establishing the call in the second communication system using the maintained MPTY call, and if the strength of a third current signal received in the first communication system is less than a predetermined third threshold, ending the call in the first communication system; and a mobile switching center (MSC) for selecting one of current available MPTY calls for the MS upon the request for the MIPTY call from the MS during the call in the first communication system, and assigning the selected MPTY call to the call in the second communication system.

8. The handoff system of claim 7, wherein the first communication system is WCDMA (Wideband Code Division Multiple Access) and the second communication system is CDMA (Code Division Multiple Access).

9. The handoff system of claim 7, wherein the MS determines the handoff to the second communication system when the number of neighbor cells in the second communication system is less than a predetermined number of neighbor cells in the first communication system.

* * * * *